July 21, 1936.  W. F. BISLEY  2,048,096
ELECTRIC MOTOR
Filed July 17, 1935   2 Sheets-Sheet 1

Inventor:
By William F. Bisley
Wilson, Dowell, McCanna & Wintercarn
Attys.

July 21, 1936.  W. F. BISLEY  2,048,096
ELECTRIC MOTOR
Filed July 17, 1935   2 Sheets-Sheet 2
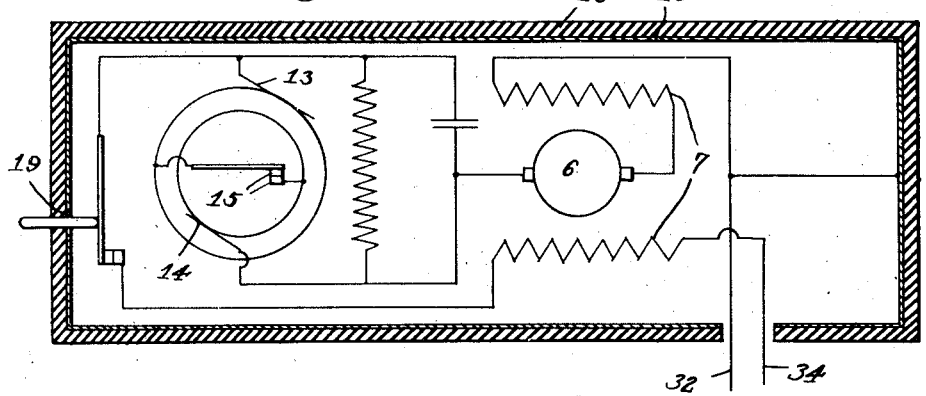
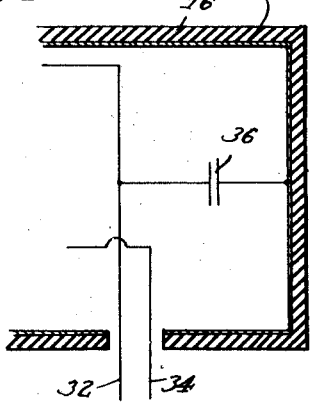
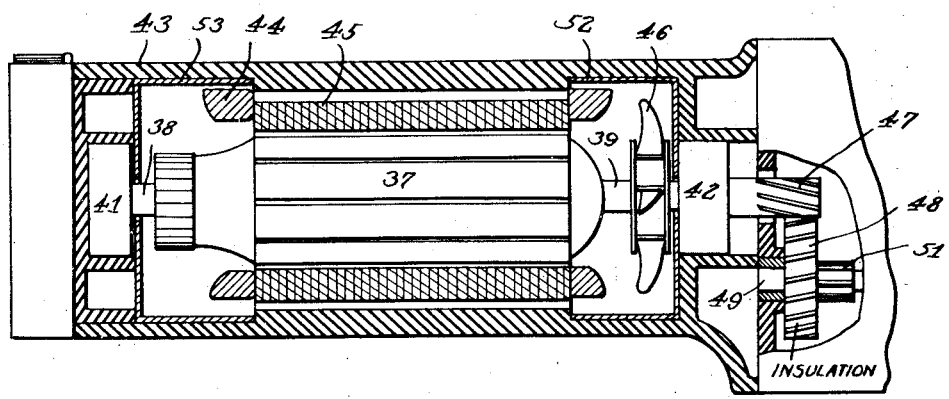

Patented July 21, 1936

2,048,096

UNITED STATES PATENT OFFICE 2,048,096

ELECTRIC MOTOR

William F. Bisley, Chicago, Ill., assignor to Chicago Flexible Shaft Company, Chicago, Ill., a corporation of Illinois Application July 17, 1935, Serial No. 31,879

4 Claims. (Cl. 172—36)

This invention relates to electrical motors and particularly to devices of the portable type having motors or other electrical mechanisms tending to set up high frequency oscillations in the course of their operation, the invention being of particular advantage in electrical household mixers.

Because of the widespread use of radio receivers in the home, the common electrical household units and appliances have become particularly annoying because of the high frequency oscillations set up by their operation which materially affect radio reception. This is caused by arcing which sets up high frequency oscillations in associated windings. This takes place in a series wound motor at the commutator, in a governor controlled motor at the contact points etc. The usual methods of shielding cannot be successfully employed because of the necessary portability and the use of these devices. As a result, numerous make-shift and only partly successful means have been employed for the purpose of minimizing this difficulty. For example, manufacturers of household mixers have employed the metallic housing of the motor as a shield upon which a low voltage has been impressed. This method has one decided draw-back in that the potential applied to the housing not only forms a shield but also produces a hazard of shock to the operator of the appliance. It is in point of fact a leakage current since current is flowing from the live parts of the motor to the case and it is, therefore, the same as a faulty or leaky insulation although it is, of course, under control. Actually a compromise must be struck between the amount of radio interference which will be tolerated and the amount of shock which can safely be withstood by the operator. Many authorities, among them the Bureau of Standards, judge the quality of electrical appliances by their non-shocking characteristics and have standards which take on the form of a maximum amount of current which may be allowed to flow between the live parts of the device and the case or housing. It will thus be seen that the elimination of radio interference and the production of good insulation properties in a portable device of this character are apparently inconsistent.

A primary object of the invention is the provision of a portable electrical device of the type setting up high frequency oscillations, having means for absorbing said oscillations, the case or housing of which is substantially without electrical charge.

Another object of the invention is to provide a portable motor unit having a shield of high potential and a housing to which there is substantially no leakage of current from the live parts of the unit.

A further object of the invention is the provision of a household mixer wherein the motor is effectively shielded against interference with radio receivers and the motor housing receives substantially no leakage of current from the live parts thereof.

Other objects and attendant advantages will become apparent to those skilled in the art from the following description and the accompanying drawings, in which—

Figs. 3 and 4 are views similar to Figure 2 showing modified forms of wiring diagram; and Fig. 5 is a longitudinal section through an animal clipper motor unit showing a further embodiment of my invention.

The invention contemplates the provision of a motor or similar electrical unit wherein arcing is produced by the operation of the device which sets up high frequency oscillations in associated windings, the device being of a portable nature such that the provision of a ground wire is either impossible or highly impractical, the motor having a metallic shield enclosing the same upon which a potential of substantially line voltage is applied and a housing for the motor made of insulating material so as to prevent contact of the operator with the shield and prevent transmission of the voltage to metallic parts exposed on the exterior of the housing.

Figure 1:
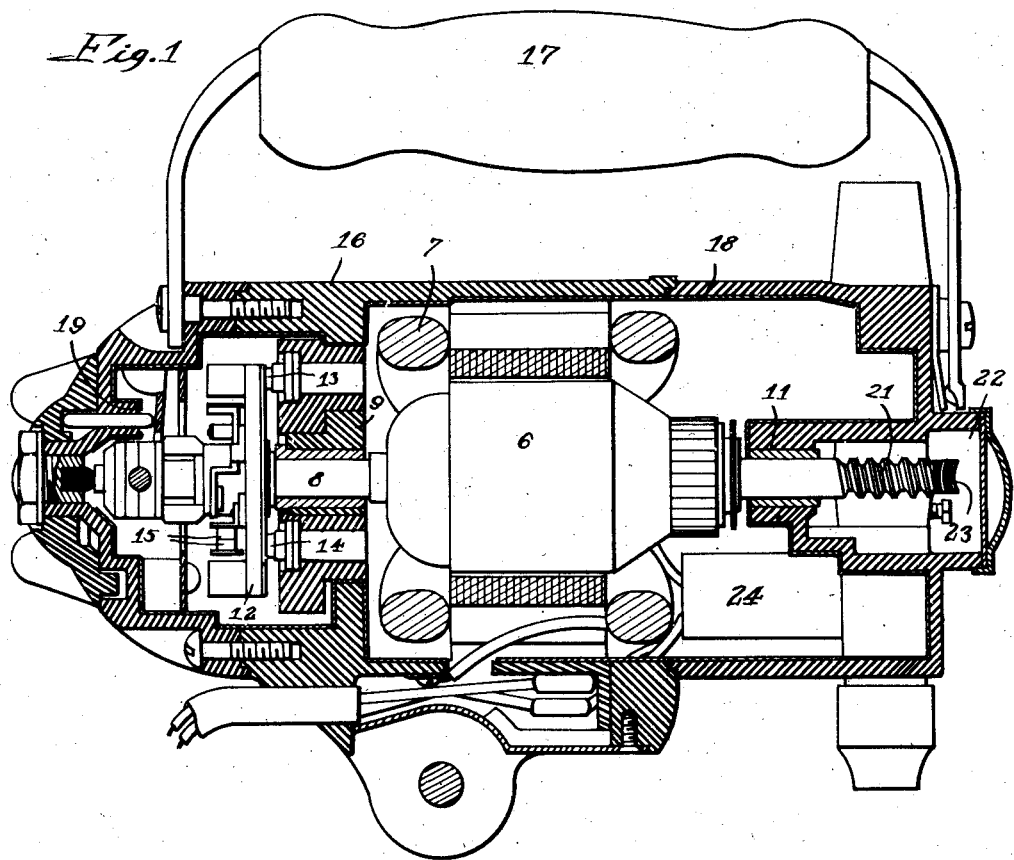
Figure 1 is a longitudinal section through a motor unit for a household mixer.

Referring first to Figure 1, I have shown the invention as embodied in the motor unit of the household mixer similar to that shown and described in Jeppsson application Serial No. 24,700, filed June 3, 1935, wherein the numeral 6 designates generally the armature of the motor. 7 is the shaft of the motor carried in bearings 9 and 11. 12 designates generally a centrifugally operated make and break mechanism for controlling the supply of current to the motor, having brushes 13 and 14 and contacts 15. The numeral 16 designates the housing or casing for the motor in which the movable parts of the motor are mounted. In the above-mentioned Jeppsson application this housing was formed of metal but in accordance with the present invention the housing is formed of insulating material, a satisfactory material being any of the so-called synthetic resins such as "bakelite", or materials in which fabric or the like is impregnated with synthetic resins, such materials of various character being obtainable on the market under a variety of trade names, such, for example, as "micarta". A handle designated generally by 17 is supported on the housing 16 by means of metallic straps. In this instance the inner surface of the housing 16 is provided with a metallic lining 18 shaped to fit snugly against the walls of the housing. A small amount of clearance such as shown at 19 is provided between the various metallic operating elements which pass completely through the housing so that there will be no contact between the metallic lining 18 and the metal parts which pass through the housing. The lining 18 forms an electrostatic shield substantially completely enclosing the motor and associated electrical mechanism which tend to produce arcing and associated high frequency oscillations. For this purpose a relatively high voltage is impressed on the shield 18 in a manner presently to be described.

In mixers of this character a forward end of the shaft 8 is provided with a worm as shown at 21 which projects into a gear casing 22 at the forward end of the motor unit. The worm 21 cooperates with worm gears 23 in the gear chamber 22, which gears are fixed to vertical spindles, not shown, for the purpose of driving the same. According to the invention the worm gears 23 are of the so-called fiber type but may be made of any satisfactory electrical insulation material so as to prevent any electrical charge present on the shaft 8 from being transmitted by way of the gears 23 to the spindles of the mixer.

It will thus be seen that while the motor is substantially completely surrounded by the shield 18, the insulating housing 16 serves to carry the motor parts, in the manner of a conventional motor housing and prevents contact of the operator with any part of the device which may cause shock. The shield 18 may be formed in numerous different ways. For example, this shield may be formed of light weight sheet metal and pressed into position against the inner wall of the housing. I have also found that the shield may be produced by spraying metal against the inner walls of the housing 16 so as to form a very thin layer of metal on the inner surface thereof. Regardless of its method of formation it must be such as to substantially completely enclose those parts of the device in which the high frequency oscillations are set up as will be understood by those skilled in the art.

Figure 2:
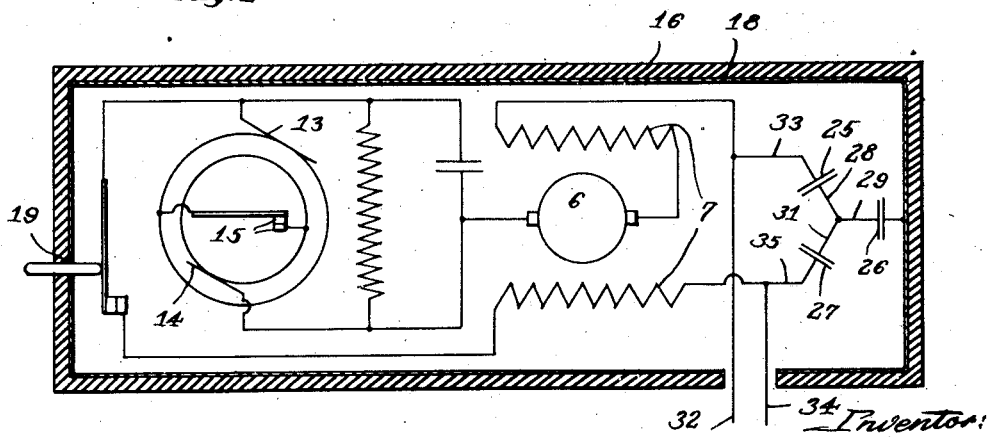
Fig. 2 is a diagrammatic showing of the unit shown in Fig. 1 giving a preferred form of wiring diagram.

It has been found that the property of shielding can be governed by the potential applied to the shield which, in the present instance, can be controlled by the value of the condenser or condensers employed. The nearer the potential approaches to line potential the greater is the resulting shielding effect. In Figure 2 I have shown a preferred form of impressing the desired potential on the metallic shield wherein three condensers are employed which may conveniently be carried in a condenser chamber 24 (Figure 1). These condensers are connected in the form of a Y with one terminal of all three condensers connected together. Two of the other terminals are connected one to each side of the line and the third terminal is connected to the housing of the motor or appliance. Thus in Figure 2 I have employed the condensers 25, 26, and 27 which have leads 28, 29, and 31 interconnecting. The condenser 25 has one terminal connected to one side 32 of the power line by means of a lead 33 while the condenser 27 has its other terminal connected to the other side 34 of the power line by means of a lead 35. With this arrangement no matter what the polarity of the motor plug as it is inserted into the electrical receptacle there will always be the same potential on the case if the values of the two condensers connected across the line are the same. This also gives a bypass circuit for the absorption of interference which might possibly be fed back onto the line. Furthermore, by this construction there are always two condensers connected in series. This gives a double protection so that in case one condenser becomes short-circuited the heavy current flow would not be impressed directly on the shield.

In Figure 3 I have shown a modified form wherein the full line voltage is impressed directly upon the shield without an intervening condenser. This construction is satisfactory for the purpose of bringing the shield to a sufficiently high potential. However, this construction is open to the objection that should, through accident or otherwise, any of the metallic parts of the unit passing through the housing come into contact with the shield the operator might be subjected to the heavy current flow associated with the line voltage should he come into contact with these parts. This eventuality is, or course, rather remote but it is nevertheless an objection to this construction and forms the basis for my preference of the form shown in Figure 2.

In Figure 4 I have shown still another construction for impressing the high potential, equal to the line voltage, on the metallic shield. This form differs from the form shown in Figure 3, in that a single condenser, as shown at 36, is interposed between the side 32 of the line and the shield 18.

It will be seen that in each of these constructions a potential equal to the voltage on the line, is impressed on the shield so as to form a high potential electrostatic shield substantially enclosing the motor proper. As a result the motor is effectively shielded against the radiation of interference which might affect radio reception. It will also be seen that I have provided a construction wherein this shield is completely enclosed by an insulating housing. In other words, the housing which carries the motor parts is made of insulation material and is lined along its inner wall with a metallic lining upon which a potential sufficiently high to effectually shield the motor is impressed. This potential is well above that which would ordinarily cause the sensation of shock to the operator but because of the construction the operator is prevented from contact with any part carrying this high potential. The spindles of the machine are insulated from the motor proper by means of gears of insulation material and the arrangement is otherwise such that the high potential is not carried by any of the parts projecting from the motor housing.

In Figure 5 I have shown a further embodiment of the invention in the form of a motor unit for an animal clipper. In this form the armature is indicated generally by the numeral 37 and is carried on motor shafts 38 and 39 supported in bearings 41 and 42 which are in turn carried on a housing 43 formed of insulation material such as "Bakelite" or "Micarta". Field coils 44 and laminations 45 are positioned within the housing 43 in a conventional manner. The shaft 39 carries a fan 46 for the purpose of circulating air through the housing. The shaft 39 extends through the forward end of the housing and is provided with a worm as shown at 47 which engages a gear 48 carried on a counter-shaft 49 which also carries a spur gear 51 for the purpose of driving the clipper blade. The gear 48 is in this instance formed of insulating material and may advantageously be one of the so-called fiber gears so as to insulate the worm 47 from the remaining portion of the gear train and the exterior metallic parts of the device. In this instance I have employed cup-shaped liners 52 and 53 pressed into opposite ends of the casing 43 so as to come into close proximity with the field laminations 45 along the walls of the housing. It will thus be seen that the cup-shaped shield members 52 and 53 together with the field laminations 45 substantially completely line the inner walls of the housing 43. The potential is impressed upon this shield in the same manner as described in connection with Figs. 2 to 4 inclusive and any one of the structures therein described may be satisfactorily used for this purpose.

Attention is directed to the fact that in the manner disclosed in this invention household and other portable electrical devices, used in places in which radio interference is apt to develop, are effectively rendered non-radio interfering without the necessity of complicated ground wires and other impractical devices. The cost of the device is not materially increased in employing the subject matter of this invention. The subject matter of the invention may also be advantageously used even though complete shielding is not essential since it eliminates the danger and the inconvenience of shock occasioned by many of the devices now on the market wherein the potential impressed on the housing of the device is practically high enough, under certain circumstances, for the operator to be conscious of the sensation of shock upon handling the same.

While I have thus described and illustrated the specific embodiment of the invention this is solely for the purpose of illustration and I do not wish to be limited except as required by the prior art and the scope of the appended claims, in which I claim:

1. The combination in a portable motor unit of a motor, a housing for said motor for supporting the parts thereof, said housing being formed of electrical insulating material, a thin metallic lining on the inner walls of said housing substantially enclosing the motor and insulated from the conductive parts of the motor extending through the housing, and means to impress a potential on said shell substantially above that normally causing shock, to prevent the operation of the unit from interfering with radio reception.

2. The combination in a portable motor device of a motor, a train of gears driven thereby having a gear insulation material, a housing for said motor formed of electrical insulation material, a metallic lining on the inner walls of said housing substantially enclosing the motor parts, and means to impress a potential on said lining sufficient to substantially prevent the operation of the device from interfering with radio reception.

3. The combination in a portable electric motor unit of a motor, a frame for said motor substantially enclosing the same formed of electrical insulation material, a metallic lining for said frame substantially enclosing the motor, means to impress a potential on said lining in the region of the line voltage on said motor, and control means for the motor passing through the frame and shell lining and insulated from the latter, to form a shock-proof motor and eliminate radio interference thereby.

4. The combination in a portable electric household mixer of a motor housing formed of insulating material and providing a motor chamber and a gear chamber, a motor in said motor chamber supported in said housing, having a shaft projecting into said gear chamber, a metallic shell lining the inner walls of said motor chamber between the housing and the motor substantially enclosing the motor, means for impressing a potential on said shell in the region of the line voltage on said motor to eliminate radio interference thereby, and a gear of insulating material in said gear chamber having driving connection with said shaft for insulating the driven parts of the mixer from said shaft.

WILLIAM F. BISLEY.